June 17, 1958 D. G. COWLIN 2,838,846
TUMBLER DRIER
Filed Aug. 16, 1954 9 Sheets-Sheet 1

DONALD G. COWLIN,
INVENTOR.
Huebner, Beehler,
Worrel & Herzig.
Attorneys.

June 17, 1958 D. G. COWLIN 2,838,846
TUMBLER DRIER
Filed Aug. 16, 1954 9 Sheets-Sheet 2

DONALD G. COWLIN,
INVENTOR.
Huebner, Beehler,
Worrel & Herzig.
Attorneys.
BY

June 17, 1958  D. G. COWLIN  2,838,846
TUMBLER DRIER
Filed Aug. 16, 1954  9 Sheets-Sheet 4

DONALD G. COWLIN,
INVENTOR.
Huebner, Beehler,
Worrel & Herzig,
Attorneys.

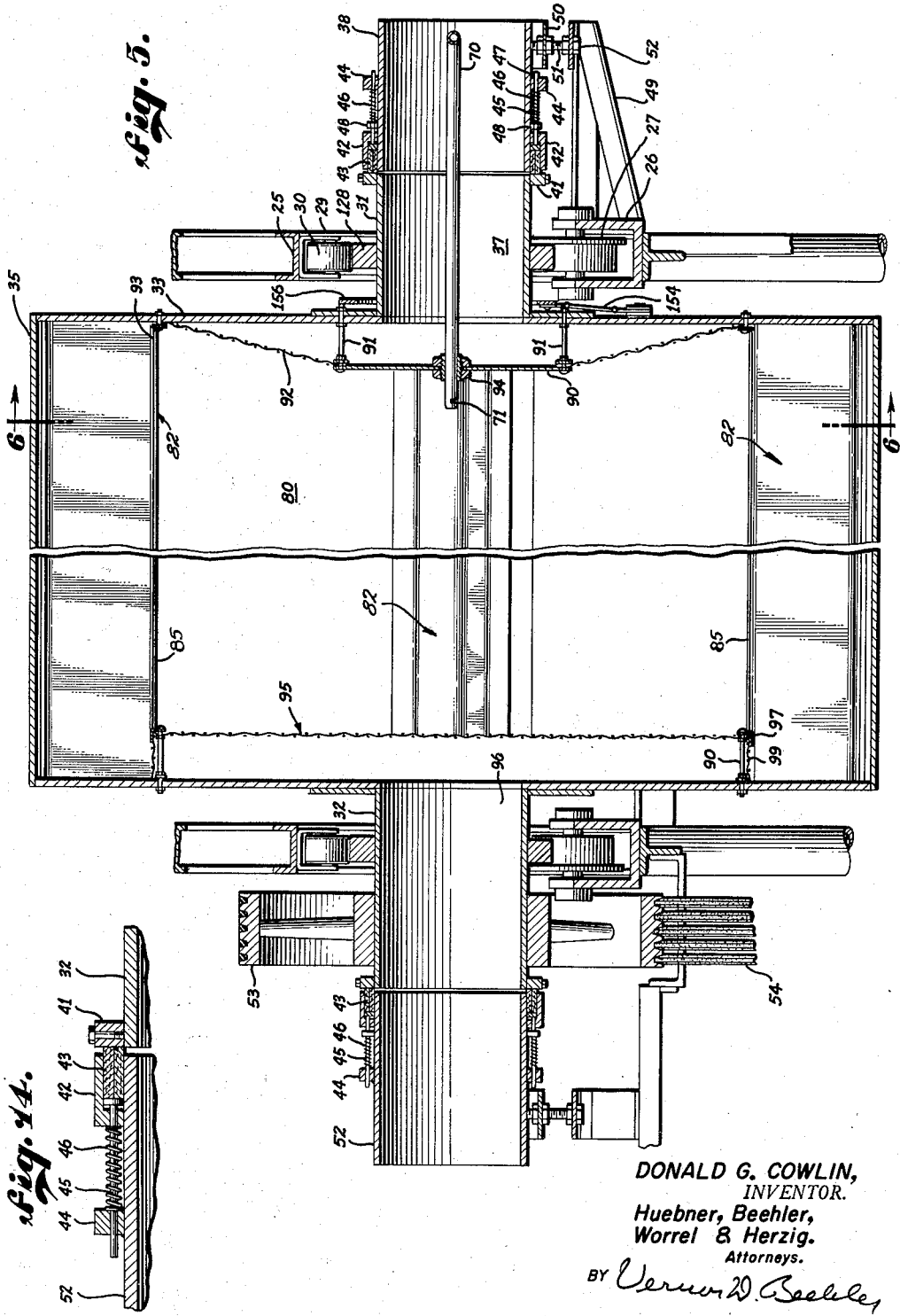

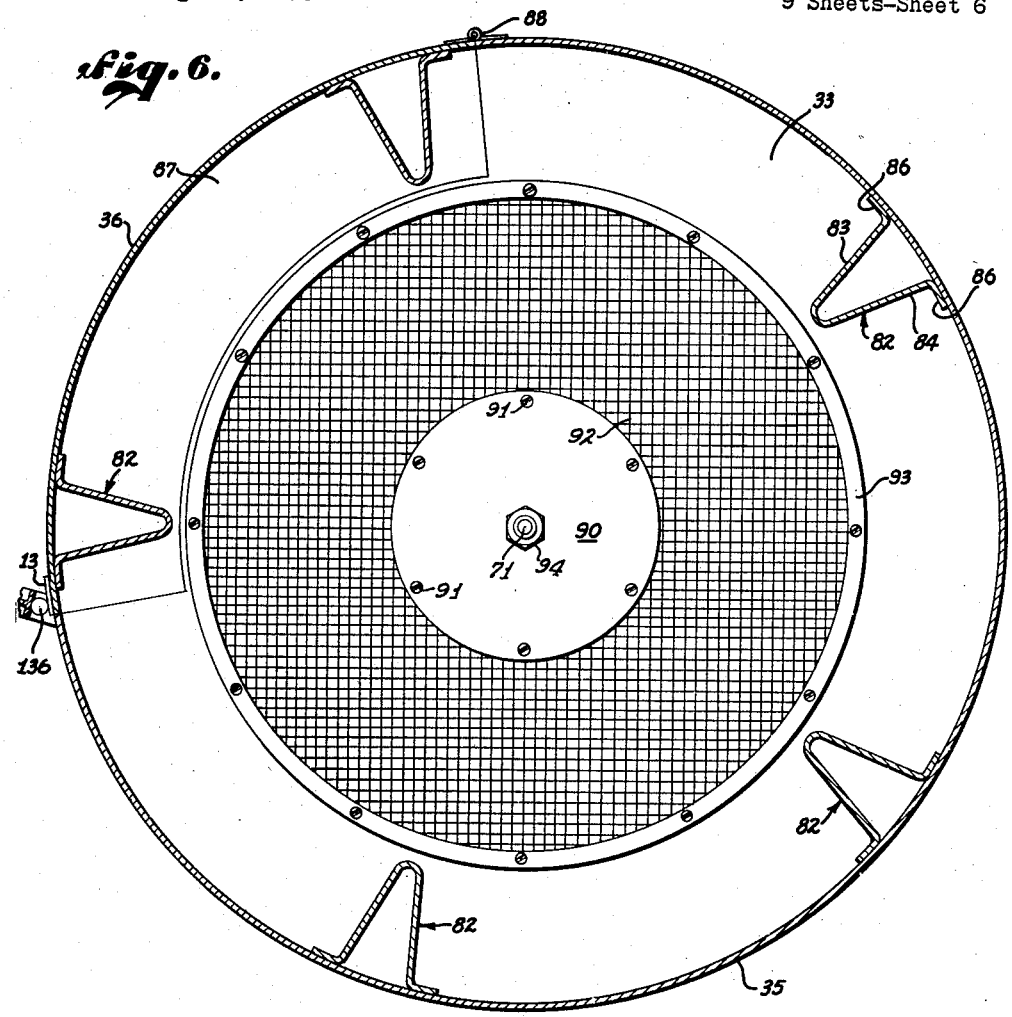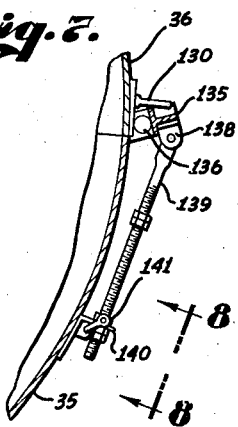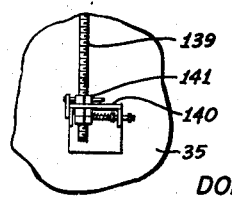

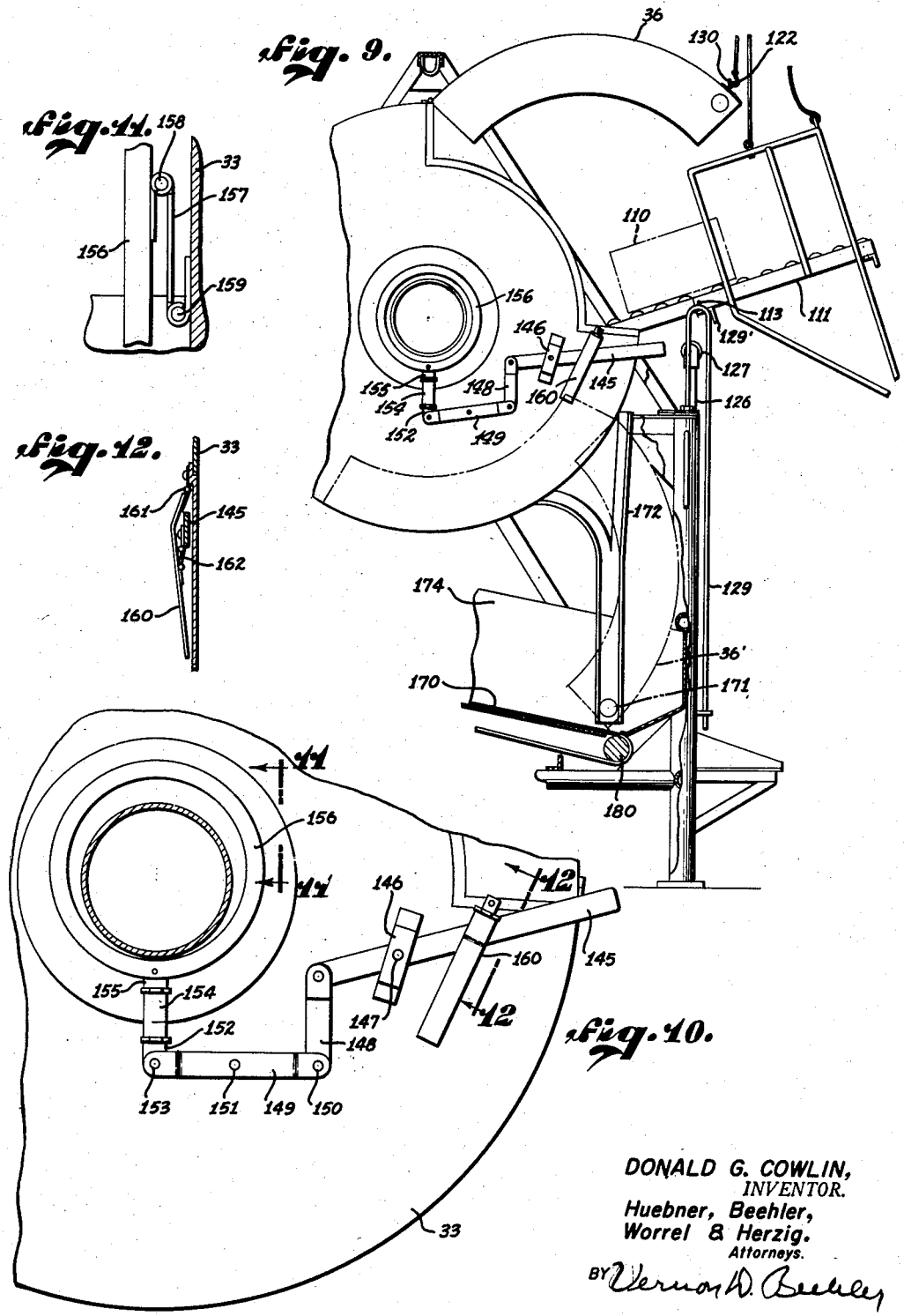

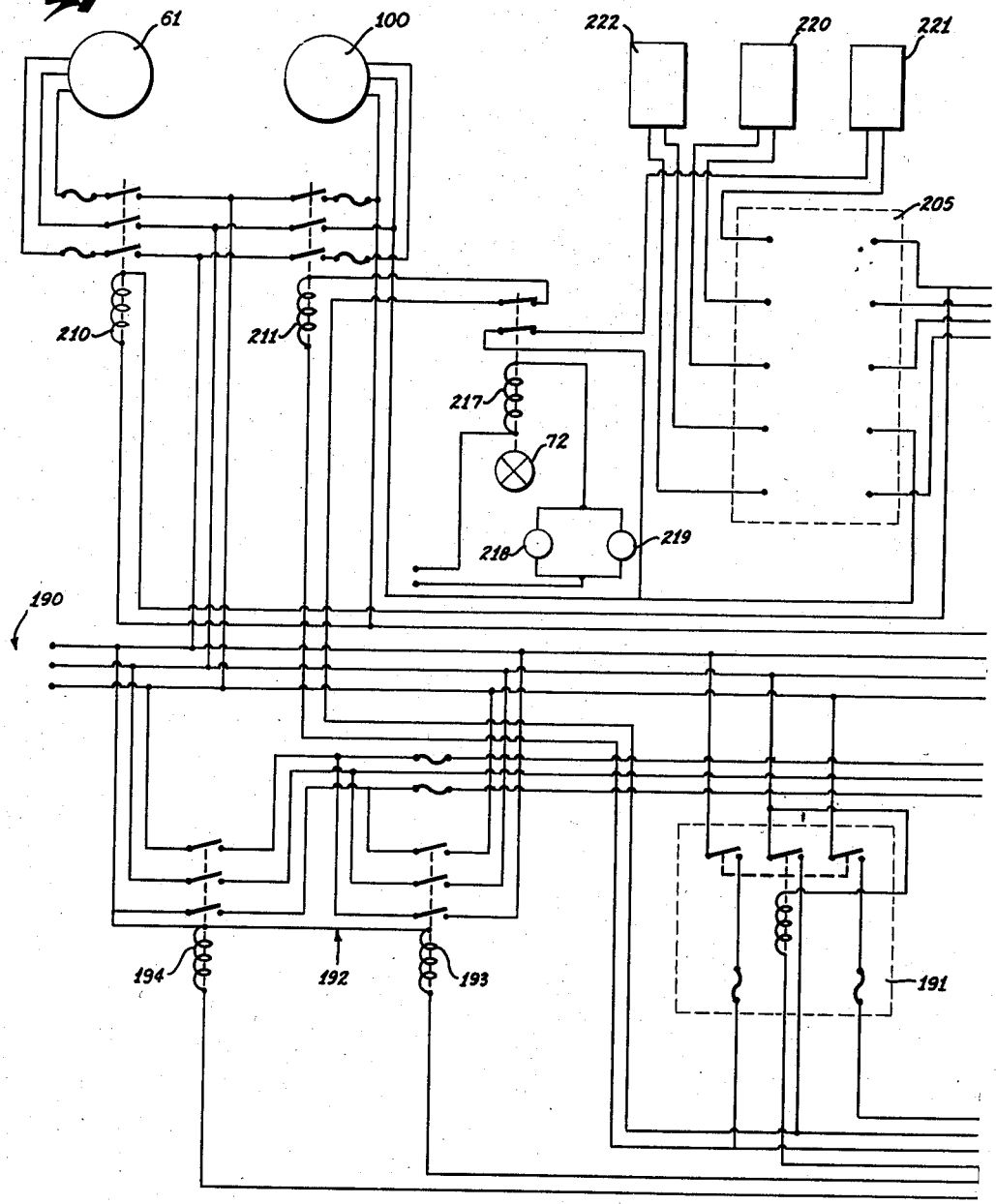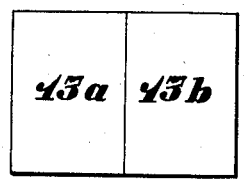

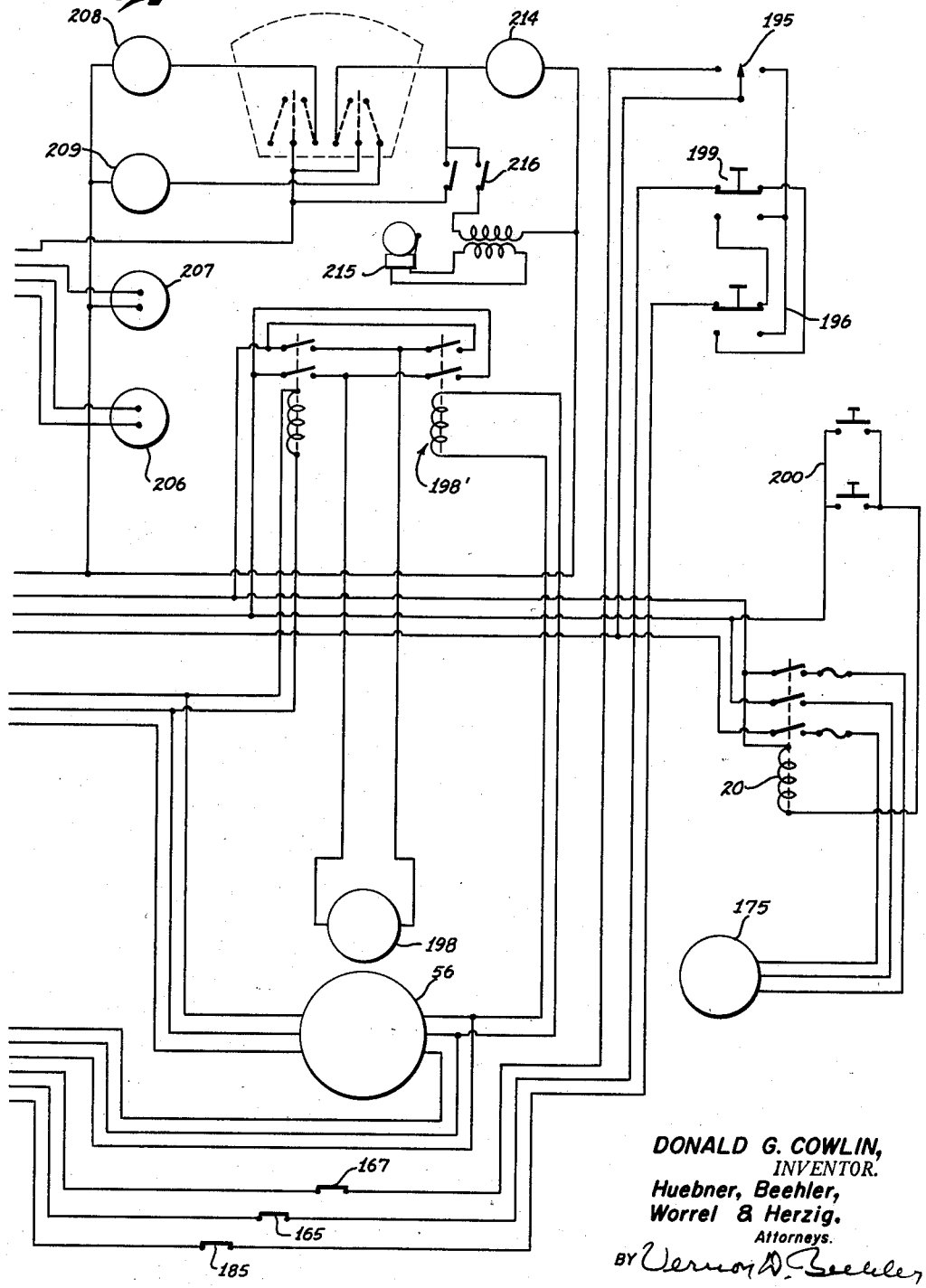

United States Patent Office 2,838,846
Patented June 17, 1958

2,838,846

TUMBLER DRIER

Donald G. Cowlin, Glendale, Calif.

Application August 16, 1954, Serial No. 449,926

18 Claims. (Cl. 34—87)

The invention relates to laundry machinery and has particular reference to what may appropriately be described as a tumbler drier by means of which large quantities of laundered fabrics from which the major portion of rinse water has been extracted are tumbled to loosen the weave, texture or nap of the fabric and at the same time dried or conditioned for ironing rapidly by the introduction and circulation of hot air which, after being forced into contact with the fabric, is drawn out of the drier together with absorbed moisture.

Common practice for many years past has taught the advantages of finally drying large masses of material by the use of air and products of combustion heated to a relatively high temperature. Various types of drying machines serving also as tumblers have been devised for this purpose. Many of them have been built for the purpose of receiving blocks of press-dried fabric so that large quantities of material can be dried at one time. Many machines of the prior art necessitate hand separation of pieces of the fabric from the press block in order that the drying may proceed effectively.

Because of the necessity of building drying drums to a relatively large scale, the rotational bearing supports for such drums have had to carry a relatively heavy load. Hot air and combustion gases in any combination need to be introduced in relatively large quantities. The introduction has presented problems in the nature of sealing conduits for the hot gases so that such gases can be introduced into a rotating drum. Rather massive structure has generally been resorted to whereby the drum can rotate in a housing into which the hot gases are introduced while the housing itself may remain stationary.

More recent attempts have emphasized the introduction of hot gases at the periphery of rotating cages with the expectation that the hot gases could be forced into the cages carrying the pieces of fabric and there circulated with sufficient efficiency to produce the necessary drying effect before the saturated hot gases are withdrawn. Such machines as have heretofore been devised have been very inefficient in the use of the hot gases inasmuch as their construction has permitted substantial proportions of the hot gases to be by-passed in such fashion as not to come into contact with the pieces of fabric material to be dried. As a result unnecessarily large quantities of hot gases have had to be used involving an unnecessarily large cost of heating and further necessitating operation of the cages, drums, or other containers for the material to be dried for unnecessarily long periods of time.

Further still, machinery items of this kind necessitate the taking of certain precautions for safety in operation of the moving parts and also for safety from the effects of fire which might occur due to faulty operation. Because of the nature of devices heretofore employed, safety features for these and other purposes, where they have been capable of installation at all, have necessitated the employment of cumbersome ineffective apparatus of an unsatifactory sort, difficult to maintain and difficult to service.

The batch type operation needed in establishments set up for drying materials by the process described has been productive of machines difficult to unload and requiring an unnecessarily long time-consuming interval between loadings.

It is therefore among the objects of the invention to provide a new and improved machine for the drying of pieces of fabric in quantity by utilization of direct flow of heated gas over the material while the material is being tumbled by motion of the container which holds the material.

Another object of the invention is to provide a new and improved rotatable tumbler drier for fabric pieces which makes possible the introduction of heated gases in such a location as to insure that substantially all of the gas is directed in contact with the fabric before it is exhausted.

Another object of the invention is to provide a new and improved rotating tumbler drier for pieces of fabric material in quantity which makes possible the introduction of hot gases into the drier at the axis of rotation and directly into the compartment which contains the pieces of fabric, there being provided additionally suitable novel seals which make continued rotation possible without inadvertent inflow of outside air.

Still another object of the invention is to provide a new and improved rotatable drier for pieces of fabric material in quantity which employs a bearing support for the rotatable drier of exceptional construction so as to permit introduction of a large volume of hot gas at the axis of rotation, the bearings further being of such construction that the rotating portion of the machine can be readily lifted from the bearings to permit their servicing or replacement.

Still another object of the invention is to provide a new and improved rotatable drier for laundered material in quantity which is so constructed that there is but a single compartment for the laundered material into which hot gases are introduced for drying and from which hot gases laden with moisture absorbed from the laundered material are readily exhausted.

Further still among the objects of the invention is to provide a new and improved rotatable tumbler or drier for laundered material which is rugged though lightly constructed, there being included a large door in a housing for the laundered material which is separably reenforced in such fashion that the door is rigid whether open or closed, the reenforcement of the door and of the rotating portion as well serving simultaneously as a rib or deflector to increase agitation of the laundered material while the container therefor is rotated.

Still further among the objects of the invention is to provide in a rotatable tumbler or drier for laundered material an automatic lift for the material while still in a press cake and damp so that the press cakes of material can be carried to an open door and there deposited without necessity for handling them manually, there being provided safety features which prevent rotation while the door is open for loading and also which prevent rotation at a high rate of speed while the door is open in another position for discharge.

Included among the objects in addition to the foregoing recited objects is to provide a new and improved rotating cylindrical tumbler or drier for quantities of laundered material which includes a positive discharge adjustment whereby the door can be gradually opened to discharge the contents upon a conveyor and thereafter readily closed while the rotatable drier is moved to another position after which the device is ready to have the door reopened immediately for loading and for the performance of a subsequent drying operation without the necessity of any delay between the two operations.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 5 is a side longitudinal sectional view taken on the line 5—5 of Figure 1.

Figure 6 is a cross-sectional view taken on the line 6—6 of Figure 5.

Figure 7 is a fragmentary longitudinal sectional view taken on the line 7—7 of Figure 2.

Figure 8 is a fragmentary elevational view taken on the line 8—8 of Figure 7.

Figure 9 is a fragmentary end elevational view looking in the same direction as Figure 1 and showing in solid lines the door open for reception of a load and in broken lines the door open for discharge.

Figure 10 is a fragmentary end elevational view partially in section looking in the same direction as Figure 9 and showing portions of the mechanism in greater detail.

Figure 11 is a fragmentary elevational view of a central portion of the rotating member taken on the line 11—11 of Figure 10.

Figure 12 is a fragmentary elevational view partly in section taken on the line 12—12 of Figure 10.

Figure 13 is a schematic arrangement to illustrate the orientation of the wiring diagrams 13a and 13b.

Figure 13a is a left-hand portion of the wiring diagram.

Figure 13b is a right-hand portion of the wiring diagram so drawn that it is to be read side by side with Figure 13a as indicated in Figure 13.

Figure 1:
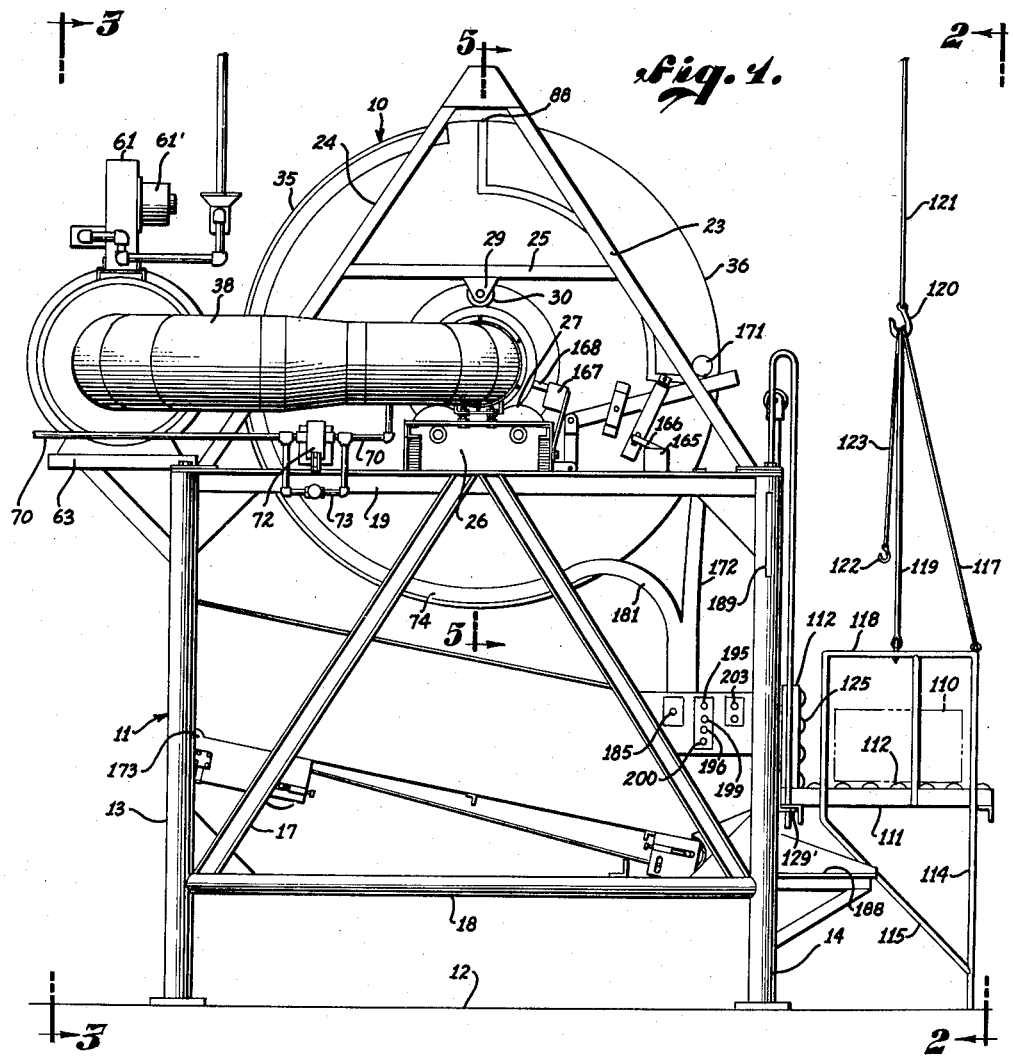
Figure 1 is an end elevational view of a form of the device chosen to illustrate the invention.

Generally speaking the apparatus here chosen for the purpose of illustrating the various aspects of the invention employs a rotating cylinder mounted at a substantial distance above the ground or floor level on a suitable frame. The cylinder rotates about its central axis. The shafts which enable the cylinder to rotate are large hollow shafts so constructed that the shaft on one side provides an inlet passage for hot, dry gas and the shaft on the other side provides an outlet passage for moisture-laden gas. At the right-hand side of the device, as illustrated in Figure 1, there is provided a special lift for elevating a press cake to a position where it can be conveniently discharged into the rotating drum. Immediately beneath the drum is a conveyor tilted slightly upwardly toward the left of the machine which is capable of receiving dried material discharged from the rotating drum and carrying it to a suitable location for lowering upon some convenient receiver. On the side of the device opposite from the loading side may be a combustion chamber by means of which gas and air is heated for injection into the rotating drum. Other known heating media may be employed such as steam coils. Suitable rotating mechanism is located at the end of the drum opposite from the end at which the hot gases are introduced. The interior of the drum is provided with appropriate screens, ribs and baffles for the effective handling of the contents of the drum when the drum is rotated. Safety elements are built into the machine which are so mounted as to manipulate switches in the electric circuit so that the drum cannot be rotated at high speed except when the door is latched and conditions are proper for high speed rotation.

More particularly the device chosen for the purpose of illustrating the invention embodies a cylindrical drum 10 mounted for rotation about its cylindrical axis on a frame indicated generally by the reference character 11. The frame is carried upon a supporting surface 12.

The frame comprises corner posts 13, 14, 15 and 16. Suitable bracing elements 17 and 18 are employed at each end respectively between the corner posts 13 and 14 and the posts 15 and 16. A horizontal beam 19 extends between the tops of the same respective posts. For joining posts 14 and 15, on one side there are provided horizontal braces 20 and 21 located intermediate tops and bottoms of the posts and a horizontal beam 22 at the tops of the same posts 14 and 15.

At each end there is provided an A frame. This frame consists of legs 23 and 24 with a bar 25 connecting the legs. The bottoms of the legs rest upon the beam 19 adjacent the tops of legs 13 and 14. A similar construction is employed at the tops of the legs 15 and 16.

Intermediate opposite ends of the beam 19 there is provided a bearing cradle 26. Forming a part of the bearing cradle are bearing rollers 27 located respectively on opposite sides of the center of rotation of the drum 10, as indicated in Figure 1. Details of the roller mounting are illustrated with greater clarity in Figure 5. The rollers in turn support a replaceable annular bearing tire 128. The cradle structure is the same on both ends of the device.

Midway between opposite ends of the bar 25 of the A frame is a bracket 29 which rotatably supports a roller 30 in each case, the roller 30 being in a position to roll upon the top of the annular tire 128 and hold the shoe in effect down upon the rollers 27. The location and construction of the A frame is such that incidentally it can be made use of to support the drum should it become necessary to remove and replace the bearing rollers 27 at any time. This is an auxiliary function of the A frame in addition to providing a means for holding the drum down upon the bearing rollers 27.

A semi-circular guard 74 extends part way around the drum at a location spaced from the boss 171 by a slight amount. In the event the door should be unlatched during slow forward rotation past the loading position, the door will be kept from flinging outwardly at that part of the rotation by engagement of the boss against the guard.

For supporting the drum 10 upon the rollers 27 there is provided a hollow shaft 31 at one end and a similar hollow shaft 32 at the other end. The hollow shaft in each instance is of relatively large diameter and is joined in the case of the hollow shaft 31 to an end wall 33 of the drum. An end wall 34 at the opposite end of the drum is connected to the hollow shaft 32. The central portion of the drum comprises a cylindrical wall 35, one portion or segment 36 of which is employed as a door.

As has already been noted, the drum is adapted to rotate about its central axis with the axis in a horizontal position. When the drum rotates, the hollow shafts 31 and 32 also rotate. It is necessary, however, to provide a rotating seal inasmuch as the hollow shafts form passages for hot gas employed in the drying process within the drum. Inasmuch as the hollow shaft 31 in the chosen embodiment of the invention also serves to provide an inlet passage 37 for hot gases, the hot gases must be conducted into the inlet passage 37. For this purpose there is provided an inlet pipe 38 which remains stationary. It will be noted by reference to Figures 3, 1 and 5 in that order that a combustion housing 39 is connected to a fitting 40 which in turn is connected to the inlet pipe 38. The inlet pipe becomes a supply pipe for the interior of the drum.

At the junction of the inlet pipe 38 and hollow shaft 31 there is provided a rotating seal. The seal consists of an annular wear ring 41 on the hollow shaft 31 located adjacent a ring flange 42 on the adjacent end of the inlet pipe 38. The wear ring may be adjustable if desired. The ring flange surrounds the end of the hollow shaft 31 which extends beyond the base of the ring flange 42. Rings 43 of brake lining material are located between the hollow shaft 38 and the ring flange 42, the packing rings bearing at one end against the wear ring 41 and again at the opposite end against a pressure or keeper ring 44. The pressure ring in turn is pressed endwise by a series of pins 45 against the pressure ring by the interposition of a spring 46 between a pin support 47 and a collar 48 on the pin. Accordingly the pressure ring will remain stationary with the inlet pipe 38 while the wear ring 41 rotates against the adjacent end of the rings 43 as the hollow shaft 31 rotates with the drum. A bracket 49 extending endwise from the cradle 26 assists by means of a suitable mounting 50 to support the end of the inlet pipe 38 adjacent the rotating seal. A bolt arrangement 51 with appropriate adjusting nuts 52 makes it possible to center the inlet pipe with respect to the hollow shaft 31. Corresponding construction appears at the opposite end as illustrated in Figure 5 where an outlet or exhaust pipe 52 joins the hollow shaft 32.

To provide a means for rotating the drum 10, a driven pulley 53 is non-rotatably mounted upon the hollow shaft 32. The pulley is constructed to receive a series of V belts 54 which in turn are connected around a drive pulley 55, in turn driven by an electric motor 56. The motor in turn is suitably mounted upon a motor base 57 on columns 58 which in turn are supported by beams 59 and 60.

Figure 3:
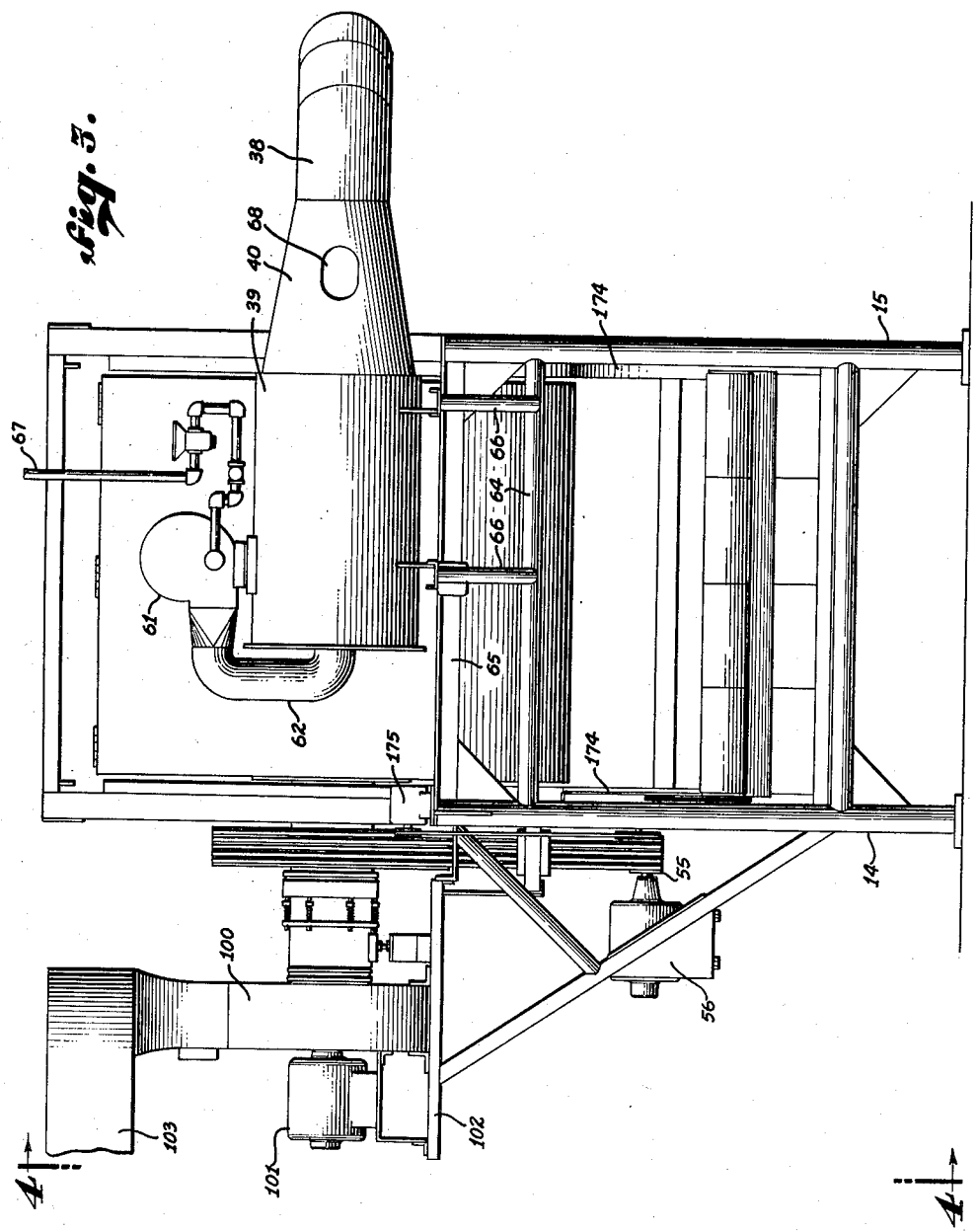
Figure 3 is a side elevational view of the device on the opposite side taken on the line 3—3 of Figure 1.
Figure 4:
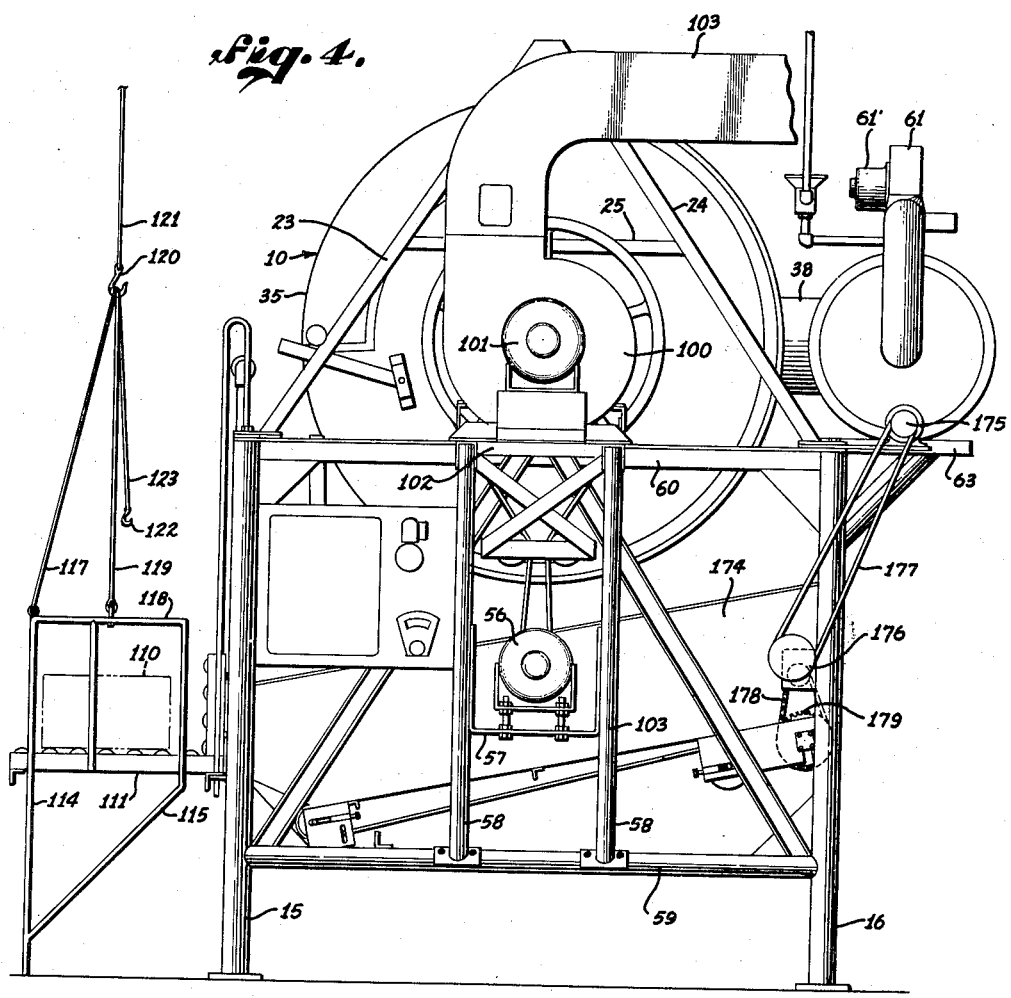
Figure 4 is an end elevational view of the device taken on the opposite end from Figure 1 on the line 4—4 of Figure 3.

To supply hot air and gas to the drum a gas heater is employed. The gas heater is housed essentially within the combustion housing 39 and fitting 40. Although the gas heater is substantially conventional in its design and operation, it should be noted that for the purpose of the invention here described a considerable volume of hot air and gas mixture should be available. For this purpose there is provided a combustion air fan 61 operated by a suitable motor which is adapted to introduce combustion air through a combustion air inlet passage 62 to the housing 39. The housing in turn is supported upon a base 63 braced to a beam 64 and resting upon a beam 65 by means of braces 66. A gas line 67 is adapted to introduce combustion gas to the inlet passage 62, as indicated in Figure 3, and also Figure 1. In Figure 1 a combustion air motor 61' is shown mounted adjacent the combustion air fan 61.

To further facilitate the proper burning of air and gas there is provided an auxiliary air inlet 68 in the fitting 40.

It should further be noted that there is provided a water or steam pipe 70 which extends axially through the inlet pipe 38 and hollow shaft 31 to the interior of the drum where the steam or water pipe is provided with an outlet 71. A control valve 72 is shown together with a by-pass 73 in the pipe on the exterior of the inlet pipe 38, as best seen in Figure 1. By this means steam or water may be introduced into the drum for certain safety purposes.

The drum has already been described as consisting of the cylindrical wall 35 and segment 36 forming the cylindrical exterior of the drum, ends of which are closed by end walls 33 and 34, respectively. These portions of the device provide a chamber 80 of ample proportions sufficient to carry a load of laundered pieces of considerable weight. In order that the drum be as light in weight as possible to reduce the mass of structure needed to support it and to afford economic operation, braces are supplied. The braces comprise a series of round edged ribs or deflectors 82. Five in number are illustrated in the device herein described. The deflectors when viewed in cross-section, as illustrated in Figure 6, have walls 83 and 84 terminating in a rounded ridge 85 at the apex of a triangular-like shape when viewed in section. Feet 86 provide a means of mounting the deflectors upon the inside surface of the cylindrical wall 35. The deflectors extend, as illustrated in Figure 5, from the wall 33 to the wall 34 continuously and are affixed to the walls to provide requisite bracing. It should be noted further that the ridges 85 are spaced radially inwardly a substantial distance from the cylindrical wall 35 so that they provide a deflector of ample dimensions which assists in the tumbling operation of articles and pieces of laundered fabric placed in the drum for tumbling and drying.

Also important in the drum construction and as a further means of maintaining its rigidity, while at the same time making it possible to be opened wide for charging and discharging, the segment 36 is extended over a substantial portion of the circumference of the cylindrical wall. The segment 36, extending lengthwise as it does from the end wall 33 to the end wall 34, provides a door of large dimension which needs special construction if it is to be sufficiently strong for the expected operation. The door has segmental end walls 87 which may be said to comprise portions of the end walls 83 and 84 respectively. More particularly deflectors are mounted upon the door and form a part of the door. These deflectors are the same in construction as already described as being mounted upon the interior face of the cylindrical wall 35. The deflectors on the door, however, are located near the straight sides and join the segmental end walls 87 at the curved sides of the door. The door is joined to the cylindrical wall 35 by means of a hinge 88 lying along one of the straight sides of the door, that is to say, along one of the straight sides of the segmental portion 36.

At the end of the drum adjacent the end wall 33, which may be considered as the inlet end of the drum and consequently the inlet end of the chamber 80, there is provided an imperforate baffle 90 of diameter materially greater than the diameter of the hollow shaft 31. The baffle is secured to the end wall by bolts 91. Surrounding the baffle is a screen 92, the screen being secured to the baffle at its circumference and being also secured to the end wall 33 beneath an annular retaining ring 93. The retaining ring is of a diameter such that it is located slightly inwardly from the rounded ridges 85 of the deflectors. The screen 92 is useful in preventing pieces of the fabric which are to be dried within the drum from clogging the passages for incoming hot gases. The imperforate baffle 90 moreover provides in addition a support by means of nuts 94 for properly locating the steam pipe 70 centrally within the chamber 80.

At the opposite end of the drum there is provided a second screen 95, the screened area of which extends entirely over the passage through the hollow shaft 32 which is in effect a portion of the exhaust passage herein indicated by the reference character 96 which communicates in turn with the outlet or exhaust pipe 52. The screen 95 is mounted by means of a ring 97 and bolts 98 to the end wall 34. This screen includes a cylindrical portion 99 which together with the screen 95 forms a complete screening protection for the exhaust passage. The presence of the last identified screen prevents any of the pieces of laundered fabric in the chamber 80 from being passed into the exhaust passage and at the same time prevents clogging of the exhaust passage and makes possible a substantially free flow of moisture-laden hot gases from the chamber 80 to the exhaust or outlet pipe 52.

To provide for effective exhausting of the moisture-laden gases there is provided an exhaust fan 100 operated by an exhaust fan motor 101. The exhaust fan and the exhaust fan motor are mounted upon a platform 102 supported by the same legs 58 which carry the motor 56. A vent pipe 103 conducts the exhaust vapors to a suitable stack (not shown).

Figure 2:
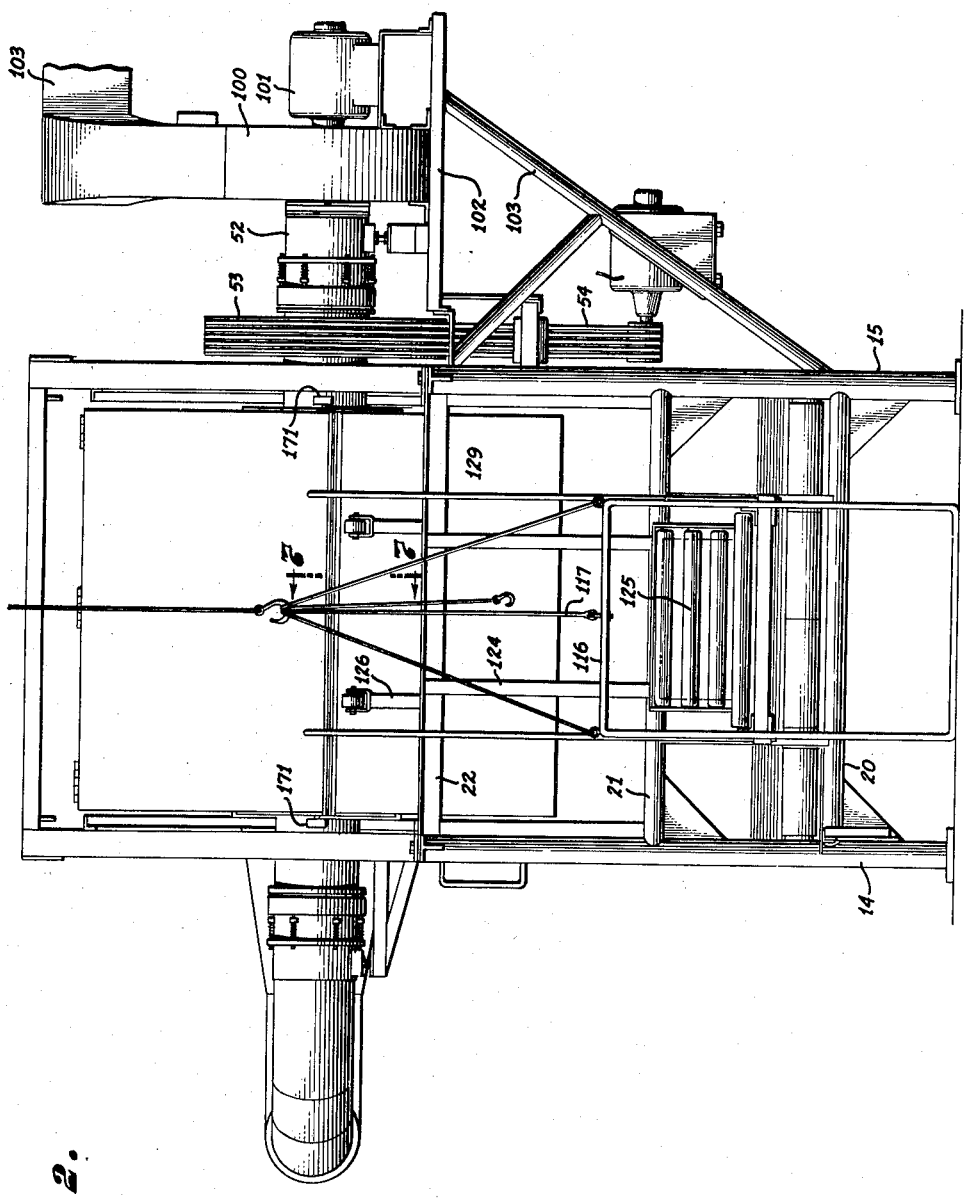
Figure 2 is a side elevational view of the device taken on the line 2—2 of Figure 1.

The laundered pieces to be dried or conditioned in the drum are ordinarily in the form of a press cake 110. These press cakes are usually heavy and in fact weigh well in excess of three hundred pounds, making them extremely difficult to handle. Inasmuch as the drum is located well above the supporting surface 12, some means need be provided for loading the drum. This is accomplished by a lift, details of which are shown to good advantage in Figures 1, 2 and 9. The press cake, often designated a press block, is adapted to be carried upon a lift platform comprising a horizontal section 111. Rollers 112 rotatably mounted upon the horizontal section actually support the press block or cake. Hinged to the horizontal section is a pivoting or articulating section 112. A pivot pin or hinge pin 113 connects the two sections together so that they can be moved from the positions illustrated in Figure 1 to the positions illustrated in Figure 9. Vertical legs 114 support the outer end of the horizontal section 111 and diagonal legs 115 support the inner end. A horizontal side element 116 provides an attachment for one strand 117 of a sling and horizontal end elements 118 provide supports for additional strands 119 of the sling. The strands 117 and 119 are looped upon a hook 120 from a lift cable 121. A door hook 122 is carried upon the end of a free stand 123 also attached to the hook 120. The raising and lowering of the lift may be accomplished by a conventional motor, not shown, manipulated by buttons 203.

To guide the lift when it is elevated, there are provided guides 129 extending vertically at the side of the frame adjacent the lift. These guides can best be seen in Figure 2. An apertured lug 129' on the horizontal section may be provided through which the guide can slide. Rollers 124' on the section 112 roll along tracks 124. Above the tracks are provided columns 126 at the tops of which are rollers 127. These rollers are adapted to support end elements 128 of the section 112 when the lift is at the upward end of its elevating movement. They serve to guide the section 112 toward the drum. Engagement of the lugs 129' with the guides 129 assist in holding the lift in alignment during its elevation and return.

When the drum is to be loaded, the lift is initially in the position illustrated in Figure 1. In that position a press block 110 is placed upon the horizontal section 111. The lift cable 121 is then elevated, raising the entire lift. For convenience and assuming the door to be unlocked, the door hook 122 is engaged in an eyelet 130 on the door. Consequently, as the sling is elevated, the door is lifted to the solid line position illustrated in Figure 9. As the lift reaches the top of its movement, the section 112 falls toward the drum when it passes the top of the rollers 127. As the lift continues to be elevated, the lugs on the horizontal section 111 are caught beneath the rounded upper ends of the guides 129 and continued lifting tilts the horizontal section 111 to the position illustrated in Figure 9. This causes the horizontal section to become an inwardly tilted roller conveyor for the press block which rolls over the rollers into the open side of the drum. Should two press blocks be loaded at the same time, it is necessary only to lower the lift to the floor in order to receive a second press block to be elevated in the same fashion, the door closing incidentally with the lowering and opening with the second lifting operation.

After the drum has been loaded, it is necessary to lock the door in closed position. For this purpose a latch is provided. The latch for holding the door closed serves a multiple purpose in that it assists in placing in operation certain safety features connected with the operation of the drum. The latch includes a bar 135 having a rod 136 fastened thereto and adapted to bear directly against the segment 36 which comprises the central portion of the door. The bar presses upon the straight side edge of the segment opposite from the hinge 88, a suitable bearing plate 137 being provided to wedge the rod against the door tightly. To force the bar and the rod into position, a bracket 138 has a locking bolt 139 swivelly mounted thereon and the locking bolt extends through a bracket 140 on the exterior surface of the cylindrical wall 35 of the drum. A manually actuated locking nut 141 is screw threaded on the bolt and when the nut is screwed in a direction pressing against the bracket 140, the bolt is forced upwardly pressing the bar and the rod into engagement with the door. The eyelet 130 serves as a stop, and prevents latching without removal of the hook.

Contrarily, when the door is to be opened, the locking nut 141 is rotated in an opposite direction, pulling the bolt 139 downwardly and removing the bar and rod from engaging position with the door.

At each end the bar is secured to a lever 145. The lever in turn is pivotally secured to a U-shaped mounting strap 146 by means of a pin 147. At the opposite end of the lever 145 is a link 148 pivotally secured to another lever 149 by means of a pin 150. The lever 149 is pivotally secured to the end wall 33 by means of a pivot pin 151. At the other end of the lever 149 is a hinged link 152 pivotally secured to the lever by means of a pin 153. The hinged link includes a section 154 which is fastened by means of still another section 155 to a ring 156. This ring has a hinged support securing it to the end wall 33. The hinged support is illustrated to good advantage in Figure 12. It will be noted that the hinged support consists of a central hinge section 157 having a pivot pin 158 joining it to the ring 156 and a pivot pin 159 joining it to the end wall 33.

In this arrangement of links and levers there is provided an arm or deflector 160, details of which are shown in Figure 12. The arm is connected by a pin 161 hingedly to the end wall 33. An intermediate hinge section 162 serves to connect the arm 160 to the lever 145.

Therefore, when the lever 145 is moved downwardly or clockwise, as viewed in Figure 10, for example, the arm 160 is rotated outwardly relative to the end wall 33. Also through the linkage the pin 153 moves upwardly, moving the link 152 upwardly and also the ring 156 downwardly. This causes the ring 156 to move outwardly with respect to the end wall 33 by reason of the hinge section 157 operating as it must in accordance with the hinging connection to the end wall. The hinged elements herein described are for the purpose of throwing switches to open and close circuits. When the door is in the open position shown in Figure 9, the lever 145 must be moved downwardly or in a clockwise direction in order to permit the door to be opened. Movement in that direction causes the arm or deflector 160 to rotate about its hinged joints, namely, in a clockwise direction, as viewed in Figure 12. This movement is designed to open a slow speed limit or safety switch 165. The switch has a switch arm 166 extending out to a position of engagement with the deflector 160.

The same movement of the lever 145 acting through the lever 149 draws downwardly upon the ring 156 causing it at the same time to shift from right to left, as viewed in Figure 11. Movement in this directoin opens a high speed safety switch 167 by pressure on a switch arm 168. When the switch is opened the high speed circuit cannot be closed. By having the ring 156 annular in shape, it will operate against the arm of the high speed switch regardless of the position of rotation of the drum.

After the loading operation has been accomplished and the door is closed, the door must be locked closed before the drum can be operated. To lock the door closed the lever 145 must be shifted upwardly until the bar 135 is pressed against the eyelet 130 where it is forced into position by rotation of the locking nut 141, as previously described.

Movement of the lever 145 upwardly causes the deflector 160 to rotate counter-clockwise, as viewed in Figure 12, thereby retracting itself to a position disengaged from the low speed safety switch 165. At the same time the lever 149 is rotated by the lever 145 in a direction pushing against the ring 156 in an upward direction.

This causes the ring 156 to shift from left to right, as viewed in Figure 12, by action of the hinge section 157. Movement of the ring from left to right removes it from engagement with the arm of the high speed safety switch 167, permitting that switch to be closed. Thereafter the circuit for motor operation is ready to be energized by appropriate means. Because the selector switch 195 can be set at only high or only low position, there is no likelihood of accidentally initiating high speed rotation while the drum is being jogged up to a position wherein the door can be closed.

After the tumbling and drying operation is completed, the dried pieces of fabric in the drum will be discharged upon a conveyor belt 170. To open the door 136, it is necessary first to release the bar 135 by unlocking the locking nut 141, after which the bar is moved away from the door by rotating the lever 145 clockwise, as viewed in Figure 10. When the lever 145 is moved downwardly shifting the position of the deflector 160, the low speed safety switch is closed, permitting low speed operation. At the same time the high speed safety switch prevents high speed operation.

After the door has been released, the drum is rotated slowly in a clockwise direction, as viewed in Figures 1 and 9. For guiding the door there are provided bosses 171 which extend laterally outwardly from the door, as viewed in Figure 2. The boss is shown in end view in Figure 1. A vertical track 172 on each side of the machine receives the respective boss 171 as the drum is slowly rotated with the door open. The door is shown in broken line position 36' at a full open condition in Figure 9. In that position the boss 171 has reached the bottom of the vertical track 172. When in that position the entire contents of the drum can be discharged from the door opening upon the conveyor belt 170.

The conveyor belt may be of substantially conventional design tilted so that the lower end is located beneath the vertical track 172 and so that an upper or discharge end 173 is near the left side of the frame 11, as viewed in Figure 1, in order that contents of the conveyor belt may be dumped upon an appropriate cart. Side walls 174 may be provided to keep the dried pieces of fabric upon the conveyor belt. For operating the conveyor there is provided a conveyor motor 175 which drives a speed reduction device 176 through a belt 177 and ultimately through a chain 178 rotates a sprocket 179 of the conveyor belt. The conveyor motor is shown as mounted upon the same base 63 which is provided to support the combustion housing 39 previously described. An idler shaft 180 for the lower end of the conveyor belt is shown in Figure 9.

After the drum has been emptied and it is desired to close the door, the drum is rotated in a counter-clockwise direction, as viewed in Figure 1, at low speed. Rotation of the drum in counter-clockwise direction lifts the hinge 88 and the bosses 171 are withdrawn upwardly in the lower portion of the track 172. Should the drum be rotated clockwise from any intermediate point during this portion of the cycle, the bosses 171 will again tend to be deflected toward the bottom of the vertical track 172. In order to assure that the device will not be jammed by rotation in a clockwise direction, as viewed in Figure 1, while the door is being opened, there is provided a limit switch 185 at the bottom of the track which is shifted to a circuit-opening position by contact of the adjacent boss 171 with it when the boss reaches the bottom of the track.

As the drum is rotated at slow speed clockwise to discharge position, the arm 160 rotates out of range of the up limit switch 165, causing it to close. Thereafter when the jog-up switch button is manipulated, the drum can be rotated by short jumps counter-clockwise to a position where the door can be closed and locked. In that position the up limit switch will again be opened and will remain open until the arm 160 is moved to lock the door.

In view of numerous adjustments on the machine being located relatively high above the supporting surface 12, there may be provided a step 188 and a hand hold 189 to assist the operator in reaching the higher operating parts of the machine, such as the door latch.

The machine herein described is designed for operation by electric power except for the opening and closing of the door. A three wire high power circuit serves the motors, there being a low power 110-volt circuit only for operation of a steam valve. As illustrated in the wiring diagrams of Figures 13a and 13b, a three wire source of power is indicated by the reference character 190. These three wires serve a two-speed motor, previously given the reference character 56, through a high-speed relay 191 and a low speed relay 192. The low speed relay has a down motion solenoid 193 and an up motion solenoid 194. The circuits are shown in Figures 13a and 13b in the condition they would have with the power off and with the door closed and locked, ready for operation. When the device is to be operated, a selector switch 195 will be closed on the high side, namely, by shifting the switch arm to the button marked "high" in Figure 13b. This will energize the high speed circuit of the two speed motor 56 by reason of the fact that a solenoid in the high speed relay 191 is energized, throwing all of the switches in that relay to closed position, feeding current from the three wire source 190 to the motor.

When the operation cycle has completed, which in normal operation of the machine at full load may be in about fifteen or twenty minutes, the selector switch 195 is switched from high position to off position. If the door is not in the right location for opening, the selector switch is then switched again to high position long enough to bring the drum to the right position. A brake 198 will stop the drum as soon as the switch is opened. The brake is activated by de-energization of a brake solenoid 198'.

It should be noted similarly that when the jog-down switch is closed energizing the down motion solenoid 193, the brake solenoid 198' will also be energized, closing the circuit through a brake 198. This is sufficient to release the brake temporarily. Whenever the jog-down switch is released opening the circuit through the solenoid 193, the circuit will also be opened, de-energizing the brake solenoid 198', thereby causing the brake 198 to be reset.

The door is now ready to be opened and the lever 145 is shifted clockwise as viewed in Figures 9 and 10, thus causing the high speed limit switch 167 to be moved to open position and the low speed limit switch to be moved to closed position. The low speed down limit switch 185 remains in closed position. The selector switch 195 is then shifted to low position whereupon the jog-down switch 196 can be closed by pressing the jog-down button. This will close the circuit through the up limit switch 165 and downward direction solenoid 193. Energization of the solenoid sends current from the three-line source 190 through the low speed winding of the motor in a direction opposite to the direction of the current when the jog-up switch is actuated. The motion of the motor will thereupon rotate the drum in short jerks until the door reaches the broken line position 36', as shown in Figure 9. At full open position the up limit switch will be tripped and the drum cannot be rotated. The brake solenoid 198' is alternately energized and de-energized by operation of the jog-down switch in the same fashion as previously described. The jog-up switch and brake operate in a similar fashion.

As the contents of the drum are spilled on the belt conveyor 170, movement of the conveyor carries them to one side. To initiate operation of the conveyor, there is provided a conveyor switch 200. The conveyor switch energizes a conveyor relay solenoid 201 which when operated closes the high power circuit to the conveyor motor 175.

When the door is to be closed, the jog-up switch 199 is manipulated until by step by step rotation of the drum at low speed the hinge 88 of the door is moved to a position comparable to that illustrated in Figure 1, at which point the bosses 171 are withdrawn from the tracks 172, the door is closed, and the bar 135 can then be returned to locked position. At the same time the high limit switch 167 is closed by operation of the lever 149 and movement of the ring 156 outwardly. The high speed circuit, however, will not be energized until the selector switch 195 is shifted from low position through off position to high position.

Also involved in the circuit are certain provisions to insure against overheating. These provisions comprise certain elements in the electric circuit and particularly that portion of the circuit which includes the combustion motor 61 and exhaust fan motor 100. Although features of the safety system are to some extent known for other uses, it is felt that an explanation of the expedients in connection with a tumbler drier of the type herein disclosed will be helpful in assisting in an understanding of the invention.

A protecting relay 205 is illustrated in Figure 13a, details of which are substantially conventional and known to those skilled in the art. The relay supplies a lighter 206 for the pilot and a lighter 207 for the gas supply. Two gas valves 208 and 209 are employed and so connected that both can be operated at one time for full heat and so that only the gas valve 209 is operated for low heat.

When the selector switch 195 is turned to high position, the circuit is closed through a combustion motor solenoid 210 and an exhaust fan motor solenoid 211 which in turn initiate operation of the combustion motor 61 and exhaust fan motor 100. At the same time the two gas valves 208 and 209 are opened so that gas flows to be ignited in the burner in sequence, the pilot valve 207 opening thirty seconds in advance of the gas valve 208.

In order to cut off the quantity of heat supplied, a two-way cut-off switch is incorporated in the circuit to the gas valve. A low temperature cut-off switch 212 is set so that when the exhaust temperature reaches one predetermined figure, the gas valve 208 will be shut off, leaving only the gas valve 209 supplying gas to the burner. A high temperature cut-off switch 213 is set so that when the exhaust temperature reaches the set figure, the second gas supply valve 209 will also be cut off. When both valves have been cut off, an alarm relay 214 is energized, sending current through an alarm bell 115 which will ring until a manual switch 216 is opened.

To still further protect the apparatus the steam valve 72 has connected thereto a solenoid 217 which is in circuit with both an exhaust temperature thermostat 218 and a thermostat 219 for reflecting the temperature within the drum 10. It has been found that good operation for safety purposes is experienced when the exhaust temperature thermostat is set at about 240° F. and the temperature for hot gases coming into the drum is set at about 725° F. When either of these two temperatures are exceeded, a 110-volt circuit is closed energizing the steam valve solenoid 217 which then operates to open a steam valve interjecting steam into the interior of the drum, thereby preventing any fire breaking out in the drying pieces of fabric. The same motion of the solenoid 217 which opens the steam valve also breaks the circuit through the exhaust fan motor 100 and combustion motor 61. By the provision of three separate devices for cutting down heat supply to the drum, a substantial and dependable safety mechanism is incorporated which will prevent dangerous conditions culminating in fire should the build up of heat in the drum become too high for any reason.

A timer 220 may be employed with the relay 205 to shut off the main gas valve at the end of a selected period of time. The machine is then shut off manually. A fan limit switch 221 is incorporated into the relay 205 to control fan operation. A flame electrode 222 is also incorporated in the relay 205.

There has accordingly been described herein a comprehensive tumbler drier mechanism capable of effectively drying press cakes of semi-dried fabric material which in some forms of the device may aggregate more than three hundred pounds dry weight, the drying time being cut substantially to a minimum by reason of introducing very hot gases into the drying drum at substantially the axis of rotation so that the ability of the dry gases heated as they are to absorb moisture is taken full advantage of. Loading and unloading mechanisms are so constructed as to be convenient to operate and effective in performance, thereby cutting down operating time by a substantial amount. Safety features built into the device in the form presented assure effective operation at all times free of the possibility of dangerous high temperature conditions which will otherwise result in improper performance.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A tumbler drier comprising a frame having upright side elements, a drum having end walls and a cylindrical body, hollow shafts extending into said end walls and rotatably supporting the drum on said upright side elements and providing respectively hot air inlet and outlet passages to the central portion of the drum, a door comprising a segment of said cylindrical body hinged along one straight side of the door to the body, said door being adapted to be opened at a loading position when the drum has been rotated to position wherein the door lies generally above the axis of rotation of the drum for loading material into the drum, said door being adapted to be opened at a discharge position when the drum has been rotated to position wherein the door lies generally below said axis of rotation, means mounted on the frame below said discharge position of the door adapted to move discharged contents of the drum away from the drum, and a loading lift on the frame comprising a platform, a stationary guide on the frame for the platform, an upper end of said guide being adjacent the loading position of the door whereby the platform is adapted to be guided to said loading position for loading the drum.

2. A tumbler drier comprising a frame having upright side elements, a drum having end walls and a cylindrical body, hollow shafts extending into said end walls and rotatably supporting the drum on said upright side elements and providing respectively hot air inlet and outlet passages to the central portion of the drum, a door comprising a segment of said cylindrical body hinged along one straight side thereof to the body, said door being adapted to be opened at a loading position when the drum has been rotated to position wherein the door lies generally above the axis of rotation of the drum for loading material into the drum, said door being adapted to be opened at a discharge position when the drum has been rotated to a position wherein the door lies generally below said axis of rotation, a sloping discharge conveyor comprising a moving section mounted on the frame below said discharge position of the door with a low end of the conveyor adjacent the door, and a loading lift on the frame comprising a movable platform, a guide on the frame for the platform, an upper end of said guide being adjacent the loading position of the door whereby the platform is adapted to be guided to said loading position for loading the drum.

3. A tumbler drier comprising a frame having upright side elements, a drum having end walls and a cylindrical body, hollow shafts extending into said end walls and rotatably supporting the drum on said upright side elements and providing respectively hot air inlet and outlet passages to the central portion of the drum, a door comprising a segment of said cylindrical body hinged along one straight side thereof to the body, said door being adapted to be opened at a loading position when the drum has been rotated to position wherein the door lies generally above the axis of rotation of the drum for loading material into the drum, said door being adapted to be opened at a discharge position when the drum has been rotated to a position wherein the door lies generally below said axis of rotation, a sloping discharge conveyor comprising a moving section mounted on the frame below said discharge position with a low end of the conveyor adjacent the door, and a loading lift on the frame comprising a movable platform, a guide on the frame for the platform, an upper end of said guide being adjacent the loading position of the door whereby the platform is adapted to be guided to said loading position for loading the drum, electric actuated power means on the frame rotatably connected to one of said shafts, locking means on the drum adapted to secure the door in closed position, a high speed circuit for said power means and a circuit breaker having parts respectively on the frame and the drum and extending into engagement with said locking means, said parts being positionable to an adjustment enabling closing of the circuit only when the door is closed.

4. A tumbler and drier for blocks of press-dried fabric pieces comprising a frame, a cylindrical drum mounted on the frame with the axis horizontal and having a cylindrical wall enclosing a chamber, said drum having end walls closing each end of the chamber, hollow cylindrical shafts extending outwardly from the center of each end wall and opening into the drum, said shafts comprising respectively inlet and outlet passages, bearings on said frame rotatably supporting said shafts and said drum, and rotating drive means operably connected to the drum whereby rotating motion is imparted to the drum, a baffle mounted in the drum adjacent to and spaced from the end wall and the shaft forming the inlet passage, said baffle including a screen extending outwardly to the respective end wall adjacent the periphery of said end wall, a screen parallel to and spaced from the end wall wherein the outlet passage opens and substantially covering said wall, a series of deflectors extending between said end walls and spaced around the cylindrical wall of the drum and extending radially inwardly, said cylindrical wall having an outwardly opening door therein intermediate adjacent deflectors.

5. A tumbler and drier for blocks of press-dried fabric pieces comprising a frame, a cylindrical drum mounted on the frame with the axis horizontal and having a cylindrical wall enclosing a chamber, said drum having end walls closing each end of the chamber, hollow cylindrical shafts extending outwardly from the center of each end wall and opening into the chamber, said shafts comprising respectively inlet and outlet passages, bearings on said frame rotatably supporting said shafts and said drum, and a drive pulley on one of said shafts whereby rotating motion is imparted to the drum, an imperforate baffle mounted in the drum adjacent to and spaced from the end wall and the shaft forming the inlet passage and larger in diameter than said inlet passage, a screen extending from the periphery of the baffle outwardly to the respective end wall adjacent the periphery of said end wall, a screen parallel to and spaced from the end wall wherein the outlet passage opens and substantially covering said wall, a series of round edged deflectors extending from one end wall to the other end wall and equally spaced around the cylindrical wall of the drum and extending radially inwardly to an annular line substantially even with the peripheries of said screens, said cylindrical wall having an outwardly opening door therein intermediate adjacent deflectors.

6. A drum for a tumbler drier comprising a generally cylindrical wall forming a closed chamber and end walls for the chamber having hollow central shafts thereon adapted to support the drum in a horizontal position, said hollow shafts forming respectively concentrically extending inlets and outlets for the drum, a curved substantially rectangular door forming a portion of said cylindrical wall and having opposite straight sides and opposite curved sides, a hinged connection between one straight side and the cylindrical wall, a deflector located upon and extending throughout the length of each straight side of the door, said deflectors forming stiffening elements for said door, and a series of additional deflectors extending from one end wall to the other and mounted on the inner face of the cylindrical wall and spaced substantially equally with respect to the deflectors on the door, said deflectors being uniformly spaced about the periphery with free edges extending radially inwardly.

7. A drum for a tumbler drier comprising a cylindrical wall forming a chamber and end walls for the chamber having hollow central shafts thereon adapted to support the drum in a horizontal position, said hollow shafts forming respectively concentrically located inlets and outlets to the chamber, a curved substantially rectangular door forming a portion of said cylindrical wall and having opposite straight sides and opposite curved sides, a hinged connection between one straight side and the cylindrical wall, substantially triangular hollow deflectors with apexes pointed inwardly and located one at each straight side of the door and forming stiffening elements for said door, and a series of additional hollow stiffening deflectors extending from one end wall to the other and mounted on the inner face of the cylindrical wall, said deflectors being equally spaced about the periphery with apexes extending radially inwardly.

8. A tumbler drier comprising a frame, a substantially cylindrical drum rotatably mounted on said frame at a distance above a supporting surface with the axis of the drum horizontal, a door comprising a section in the periphery of said drum hinged along one horizontal side to the drum and having an open loading position when the drum has been turned door side up, and a loading lift comprising vertical guide means on the frame, a platform having a horizontal section adapted to receive a press block of semi-dried fabric pieces and an articulating section hinged to the side of the horizontal section adjacent the drum, said articulating section being initially extended upwardly, and a lifting means on the lift whereby the lift is adapted to be raised to discharge position adjacent the door on the drum, said guide means having upper restraining portions adapted to guide said articulated section toward the open door of the drum whereby the press block is guided into the drum.

9. A tumbler drier comprising a frame having upright side elements, a substantially cylindrical drum rotatably mounted on said elements at a distance above a supporting surface with the axis of the drum horizontal, a door comprising a section of the periphery of said drum hinged along one horizontal side to the drum and having an open loading position when the drum has been turned door side up, and a loading lift comprising a pair of vertical tracks on the frame adjacent one side, a platform having a horizontal section adapted to receive a press block of semi-dried fabric pieces and an articulating section hinged to the side of the horizontal section adjacent the drum, said articulating section being initially extended upwardly, legs on the horizontal section, and a lifting means on the lift whereby the lift is adapted to be raised to a discharge position adjacent the door on the drum, said tracks having upper portions adapted to guide said articulating section toward the drum and restrain elevation of one side of the horizontal section when the lift is at uppermost position whereby the press block is guided into the drum.

10. A tumbler drier comprising a frame having upright side elements, a substantially cylindrical drum rotatably mounted on said elements at a distance above a supporting surface with the axis of the drum horizontal, a door comprising a section of the periphery of said drum hinged along one straight side to the drum and having an open loading position when the drum has been turned door side up, and a loading lift comprising a pair of vertical tracks on the frame at one side thereof, a platform having a horizontal roller section adapted to receive a press block of semi-dried fabric pieces and an articulating roller section hinged to the side of the horizontal section adjacent the drum, said articulating roller section being initially extended upwardly adjacent said tracks, legs on the horizontal section, and a sling on said lift whereby the lift is adapted to be raised to a discharge position adjacent the door on the drum, said tracks having upper restraining and guide portions directed toward the loading position of the door and adapted to guide said articulating section toward the drum and restrain elevation of one side of the horizontal section when the lift is at uppermost position whereby the press block is guided into the drum, said guide portions being adapted to direct return of said articulating section to vertical position when the lift is lowered and hook means respectively on the sling and on the free side of the door adapted to lift the door to open position when the lift is at uppermost position.

11. A tumbler drier comprising a drum, end walls for the drum and a hollow shaft member extending outwardly from each end wall providing respectively air inlet and outlet passages to the drum, a frame, a frame element at an upper portion of the frame adjacent each shaft member, a bearing cradle on each frame element adapted to support the respective hollow shaft member, a stationary hollow pipe member mounted on the frame in endwise relation to each hollow shaft member and a rotating seal therebetween, said seal comprising an outwardly extending packing flange on one of said members, a telescoping portion of the other member encompassing said first identified member, an annular sealing ring secured within the telescoping portion, and spring pressed means between the sealing ring and said other member biased against said sealing ring whereby to push said sealing ring against said packing flange during rotation of the drum.

12. A tumbler drier comprising a drum having a side wall, end walls and a hollow shaft member extending outwardly from each end wall providing respectively air inlet and outlet passages to the drum, a frame having upright side elements adjacent the end walls, A frames at the tops of the side elements, a bearing cradle on each side element adapted to support the hollow shaft member on the adjacent end wall, a hold-down bearing on each A frame above the bearing cradle, a stationary hollow pipe member mounted on the frame in endwise relation to each hollow shaft member and a rotating seal therebetween, said seal comprising an outwardly extending flange on one of said members spaced inwardly from the end thereof, a ring flange on the other member telescopingly encompassing said one member, a packing ring on said one member adjacent the outwardly extending flange, an annular sealing ring secured within the ring flange, pins on said sealing ring extending through said ring flange, and spring means biased against said pins whereby to push said sealing ring against said packing ring during rotation of the drum.

13. A tumbler drier comprising a drum, end walls for the drum and a hollow shaft member extending outwardly from each end wall providing respectively air inlet and outlet passages to the drum, a frame, a frame element at an upper portion of the frame adjacent each shaft member, a bearing cradle on each frame element adapted to support the respective hollow shaft, a stationary hollow pipe section member mounted on the frame in endwise relation to each hollow shaft section and a rotating seal therebetween, and a stationary steam pipe extending from the stationary pipe section along the axis of the hollow shaft section providing the air inlet passage and into the drum at the axis of rotation and concentrically with respect to the hollow shaft for incoming heated air whereby to provide means for introducing an aqueous agent or water spray into the drum adjacent the warm air inlet should the air temperature get too high.

14. A tumbler drier comprising a drum having end walls, a frame having upright side elements rotatably supporting said drum with the axis horizontal for forward and reverse rotation, a door for the drum comprising a segment of the drum hinged to the drum along a side of the door facing the direction of forward rotation of the drum, a locking bar adapted to be moved to a position overlying a free edge of the door in closed position of the door, electric actuated high speed and reversible low speed power means on the frame rotatably connected to the drum for rotation of the drum, a high speed and a low speed electric circuit for said power means, and a safety mechanism for inhibiting high speed rotation of the drum when the door is unlocked comprising a trip element mounted on one end wall of the drum adjacent the respective side element, said trip element having one position when the door is locked by said bar and another position when the door is unlocked by said bar, a switch on the frame in the high speed circuit having a switch arm automatically movable to open position when the arm is out of engagement with said trip element, said switch arm being engageable by said trip element in one position thereof to close the switch and the high speed operative circuit, a linkage pivotally mounted on said end wall and having a hand lever secured to said locking bar, a deflector operably associated with said lever and attached to said end wall for movement by said lever to one position when the door is locked and to another position when the door is unlocked, and a switch on the frame in the low speed circuit having an arm adapted to be moved by said deflector in only one position thereof whereby to close the switch and the low speed circuit when the locking bar is moved to unlocked position while the switch in the high speed circuit is simultaneously enabled to move to open position.

15. A tumbler drier comprising a drum having a cylindrical body and flat end walls on the body, a frame having upright side elements roatably supporting said drum with the axis horizontal for forward and reverse rotation, a door for the drum comprising a segment of the cylindrical body hinged to the body along a side of the door facing the direction of forward rotation of the drum, a locking bar adapted to be moved to a position overlying a free edge of the door in closed position of the door, a laterally extending projection on the door and a track on an adjacent side element below the drum adapted to receive said projection when the door is opened at discharge position and the drum is rotated at low speed in reverse direction to door-open position, electric actuated high speed and a low speed reversible power means on the frame rotatably connected to the drum for rotation of the drum, a high speed and a low speed electric circuit for said power means, and a safety mechanism for inhibiting high speed rotation of the drum when the door is unlocked comprising a ring hingedly mounted on one end wall of the drum adjacent the respective side element having a retracted position when the door is unlocked and an extended position when the door is locked, a switch on the frame in the high speed circuit having a switch arm normally in closed position for the switch when the ring is in retracted position and adapted to be engaged by said ring in extended position thereof to open the switch and break the high speed circuit, a linkage pivotally mounted on said end wall and having a hand lever secured to said locking bar, a deflector operably connected to said lever and hinged to said end wall for movement with said lever to an outward position when the bar is moved to unlocked position relative to the door, and a switch on the frame in the low speed circuit having an arm adapted to be moved by said deflector whereby to close the switch and close the low speed circuit to enable low speed rotation of the drum.

16. A tumbler drier comprising a frame, a drum having end walls and a cylindrical side wall forming a chamber, hollow shafts extending into said end walls and rotatably supporting the drum on said frame and providing respectively hot air inlet and outlet passages to the chamber, an imperforate baffle concentrically located with respect to the hot air inlet and spaced inwardly therefrom and a perforate baffle surrounding said imperforate baffle, a perforate screen surrounding and spaced inwardly from the outlet passage, a door comprising a portion of said side wall hinged along one straight side to said side wall, said door being adapted to be opened at a loading position when the drum has been rotated to position wherein the door lies generally above the axis of rotation of the drum for loading material into the drum, said door being adapted to be opened at a discharge position when the drum has been rotated to a second position wherein the door lies generally below the axis of rotation.

17. A tumbler drier comprising a frame, a drum having end walls and a cylindrical side wall forming a chamber, hollow shafts extending into said end walls and rotatably supporting the drum on said frame, said shafts having passages therethrough terminating respectively at said end walls and providing respectively hot air inlet and outlet passages to the chamber, an imperforate baffle concentrically located with respect to the hot air inlet and spaced inwardly therefrom and a perforate baffle surrounding said imperforate baffle, a perforate screen surrounding and spaced inwardly from the outlet passage and a door comprising a portion of said side wall movably mounted on said side wall.

18. A tumbler drier comprising a frame, a drum having end walls and a cylindrical side wall forming a single chamber, hollow shafts extending into said end walls and rotatably supporting the drum on said frame on a horizontal axis of rotation, said shafts having passages therethrough terminating respectively substantially at inside faces of said end walls and providing respectively hot air inlet and outlet passages to the chamber, a series of circumferentially spaced ribs extending radially inwardly from an inside face of said side wall, an imperforate baffle spaced axially inwardly from said inlet passage and an annular screen between the circumference of the baffle and the respective end wall adjacent inner ends of said ribs, a screen spaced axially inwardly from said outlet passage and attached at its perimeter to the respective end wall adjacent the inner ends of said ribs, and an access door movably secured to said side wall.

References Cited in the file of this patent

UNITED STATES PATENTS

| | | |
|---|---|---|
| 732,561 | Johnson | June 30, 1903 |
| 771,108 | Wallace | Sept. 27, 1904 |
| 1,571,703 | Butzbach | Feb. 2, 1926 |
| 1,664,098 | Yates | Mar. 27, 1928 |
| 2,079,280 | Couch | May 4, 1937 |
| 2,253,047 | Purkett | Aug. 19, 1941 |
| 2,393,380 | Jorgenson et al. | Jan. 22, 1946 |